July 4, 1967 D. W. HILTON 3,329,046
METHOD AND APPARATUS FOR STRIPPING WIRE
Filed Dec. 9, 1965 2 Sheets-Sheet 1

INVENTOR
DAVID W. HILTON
BY Steward & Steward
his ATTORNEYS.

United States Patent Office 3,329,046
Patented July 4, 1967

3,329,046
METHOD AND APPARATUS FOR STRIPPING WIRE
David W. Hilton, Robertson Drive, Bethany, Conn.
Filed Dec. 9, 1965, Ser. No. 512,752
7 Claims. (Cl. 81—9.51)

ABSTRACT OF THE DISCLOSURE

A method of and tool for stripping coverings, including insulating material and waterproofing jackets, from continuous lengths of electrical wire and cable, wherein the covering is first stretched uniformly away from the core and then slit lengthwise while thus stretched.

---

This invention relates to methods and means for stripping the covering from wire and cable, and it relates more particularly to a method and apparatus for stripping coverings, such as insulation, from lengths of wire, in order to salvage the conductor or core, as well as the covering material where such material is a reusable thermoplastic.

It is common practice in the wire manufacturing industry to scrap, at considerable expense, large amounts of wire which for one reason or another are not usable. Usually the insulation is too thin or is otherwise defective. It is not uncommon to scrap as much as thirty or a hundred thousand feet of wire at a time. Some wire manufacturers are equipped with incinerators for burning the insulation from the defective wire in order to save the metal conductor. But this requires that the conductor be cleaned before it can be used again. Moreover, burning may destroy the physical and electrical properties of the conductor, which means that it can not be reused but must be sold as scrap metal.

Various means have been devised heretofore for removing wire coverings of different kinds from the conductor, but to my knowledge none has been very satisfactory in completely removing such coverings so that the conductor can be reinsulated or jacketed without first cleaning or otherwise treating the conductor. Since great lengths and amounts of wire are frequently involved, it is completely out of the question economically to strip by hand with a handheld tool. Moreover, stripping tools devised heretofore have invariably damaged the surface of the metal conductor or reduced its diameter by placing the wire under too much tension.

It is an object of the present invention to provide a method and apparatus or tool which can strip various types of coverings from wire without damaging the core or metal conductor. Another object of the invention is to strip wire at a high rate of speed, both in long and short lengths, and a greatly reduced cost. Still another object of the invention is to strip any stretchable jacket from a wire or cable core which may have an inner insulating covering, so that the core can be reused again. In other words a primary object of the invention is to strip any stretchable outer covering from an inner core or conductor, to which the outer covering is not securely bound.

Broadly the invention resides in stripping coverings from wire or cable cores by drawing the core of the wire through a stationary tool and uniformly spreading the covering outwardly away from the core all the way around the circumference of the wire by forcing it over a tapered portion of the tool. This spreading action does two things. First, it centers the core with respect to the opening in the spreader tool, through which it is drawn, so that it does not bear against the tool and become worn or scored. Secondly, it stretches the covering so that it will split apart readily longitudinally of the wire when engaged by a cutting tool located in the path of the covering in the area where it is being spread outwardly. When thus split, the covering falls away from the core, which is wound onto a take-up reel. It will of course be understood that the invention is primarily directed to stripping coverings which are at least to some degree stretchable and which do not adhere so tightly to the conductor or core that they will not separate cleanly therefrom.

In accordance with one important aspect of the invention, apparatus for stripping wire includes a sleeve member having a longitudinal passage through which the core or conductor is continuously drawn. The diameter of this passage where the core enters the sleeve is only slightly larger (e.g. a few thousandths of an inch) than the diameter of the core from which the covering is to be stripped. The sleeve member is tapered at its leading end so that the covering of the wire will travel over the tapered surface and be spread outwardly away from the core as the latter is drawn through the sleeve. As the covering rides up on the taper of the spreading sleeve, it is stretched so that it splits readily when it engages the cutting edge of a cutter located near the tip of the taper on the sleeve. As will be more readily apparent hereinafter, it will be observed that the sharpness of the edge of the spreading sleeve where the tapered surface and core passage meet, the exact position of the cutting edge, the slope of the tapered surface, as well as the amount of clearance between the core and the passage in the sleeve, all will depend in large part on the size of the wire and the physical properties of the covering to be stripped. The cutter for splitting the covering as it is being stretched by the tapered sleeve may be a sharp knife blade or a power-driven rotary blade and, if desired, more than one such blade may be disposed around the tapered tip of the sleeve member.

It will be apparent from the foregoing and from the specific description hereinafter of one particular tool embodying the invention that the method and apparatus of this invention provide substantial advantages over prior systems and devices for stripping wire, among which are its extreme simplicity and small cost, both to make and operate, as well as its dependability. These and other advantages and objects of the invention will be more readily appreciated from the following description and from the accompanying drawings, which show one form of stripping tool embodying the invention.

Figure 1:
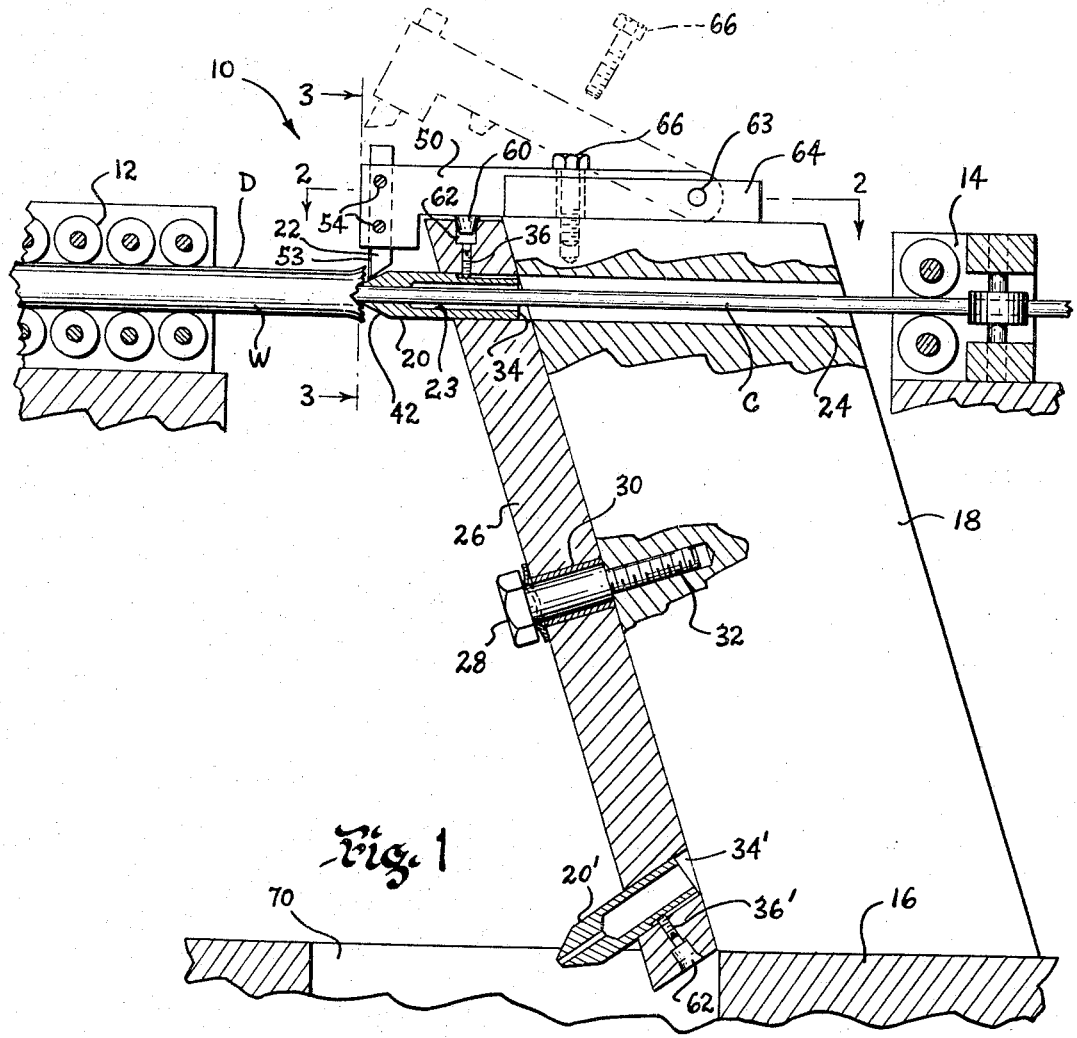
FIG. 1 is a side elevation, partially broken away and in section, of a wire stripping tool embodying one aspect of the invention.
Figure 2:
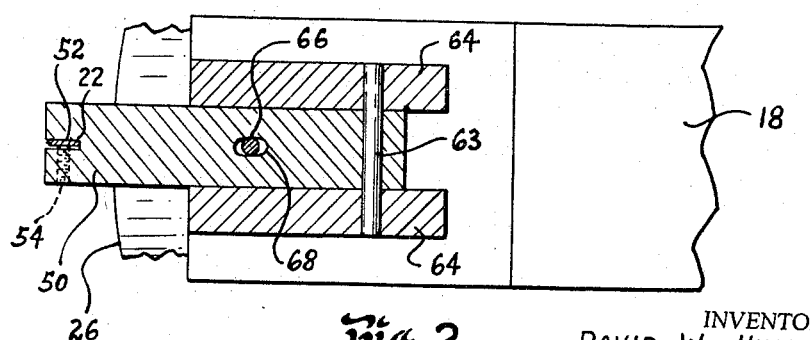
FIG. 2 is a horizontal section through the knife holder taken on the line 2—2 of FIG. 1 and looking in the direction of the arrows.

The wire stripping tool 10 of the invention is readily mounted on a suitable tool stand (not shown) which is placed between conventional wire pay-off and take-up reels( likewise not shown), so that the wire W to be stripped can be fed through suitable guide rollers or straighteners, shown more or less diagrammatically at 12, to the stripper 10, through a set of vertical and horizontal guide rolls diagrammatically shown at 14, and thence to the take-up winch. A suitable mounting plate 16, which is fastened to the tool stand, has rigidly extending upwardly therefrom an upright 18 for mounting a hollow stripping sleeve 20 and a splitting blade 22, which form the principal elements of the stripper 10. Wire W is threaded through a central passage 23 in sleeve 20 and a horizontal passage 24 in the upper end of upright 18 directly in back of sleeve 20.

Figure 3:
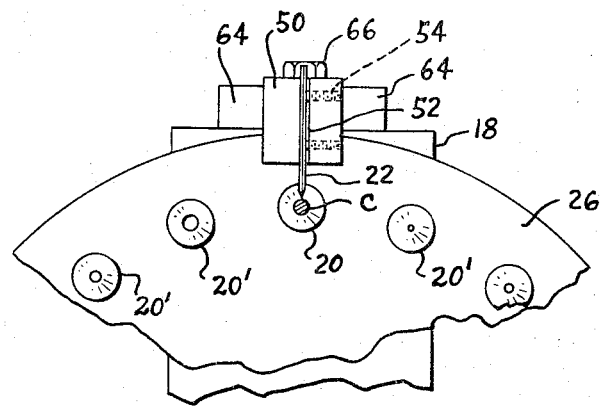
FIG. 3 is a front view taken on the line 3—3 of FIG. 1, looking in the direction of the arrows, with the lower portion of the tool broken away.

In this instance a plurality of stripping sleeves 20, 20' are mounted in a ring (FIG. 3) on a turret 26, which is rotatably supported on the front edge of upright 18 by means of a pivot shaft 28, having a bearing 30 and mounting bolt 32 threaded into upright 18. As will be more fully described hereinafter, each of stripping sleeves 20, 20' is adapted to strip wire of various sizes and types, and may be readily moved into position in alignment with passage 24 by simply rotating turret 26, the sleeve 20 being the one in use at the moment. Sleeves 20, 20' are removably held in suitable mounting holes 34, 34' in turret 26 by means of set screws 36, 36' which engage threaded bores at the base of enlarged openings extending inwardly from the periphery of turret 26.

Figure 4:
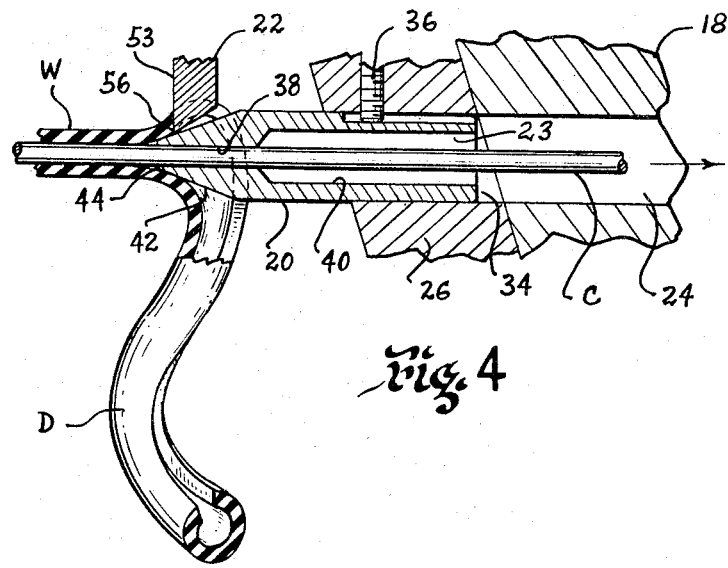
FIG. 4 is an enlarged detail view taken in vertical section, showing the relationship of the conical stripping sleeve and splitting blade.

Referring now more particularly to FIG. 4, it will be noted that the central passage 23 in stripping sleeve 20, through which the core C of wire W travels, consists of a forward section 38 and a rear section 40. The inside diameter of the section 38 at the tip of sleeve 20 is only slightly larger than the outside diameter of the core C, while the section 40 is of enlarged diameter in order to provide adequate clearance around the core after it has passed through the close-fitting section 38.

An outer conical surface 42 at the leading end of sleeve 20 flares outwardly from the tip 44 where it forms a relatively sharp intersection with the guide section 38 of the central passage 23. The axis of the conical surface 42 exactly coincides with the longitudinal axis of central passage 23, so that when the core C of the wire is drawn through sleeve 20, its covering D, which is too large in diameter to pass through the opening 38, rides up on conical surface 42, as shown in FIGS. 1 and 4, forcing the covering to spread outward evenly all around the core. This stretches the covering D as it comes into engagement with blade 22 so that it splits readily. Moreover, because the conical tip of the stripping sleeve forces the covering out symmetrically, the core C is centered within the opening 38 of the sleeve, so that during the stripping operation very little, if any, contact is made between core C and the sleeve 20. The splitting blade 22, which is stationary, is mounted in this instance with its point just behind the tip 44 of sleeve 20 where the covering D has been stretched as it rides up on the conical surface 42.

It will be noted that by placing blade 22 behind the tip 44 of sleeve 20, there is no possibility of the blade coming in contact with and damaging core C of the wire. Moreover, no pressure is applied on the wire by blade 22 in a lateral direction. Consequently, there is no tendency for the blade to move the core off the longitudinal axis of stripping sleeve 20, as would be the case, for example, if the blade 22 were located well forward of the tip of the stripping sleeve in order to slit the covering before it reaches the conical spreading surface 42.

Nevertheless, it is apparent that since the covering D begins to spread outward somewhat in front of tip 44, it may be possible, and even desirable in some instances, to place the splitting blade slightly forward of the tip of the stripping sleeve 20 where the covering D is just beginning to be spread by the conical spreading surface 42. Care should be taken in that event to be sure that the blade does not come in contact with the core of the wire being stripped. This situation may occur, for example, when stripping very small diameter wire or wire with tough covering materials, which tend to pile up at the tip of the spreading cone instead of riding up on it. It is in such instances that a rotary cutter may be required in place of the straight-edge blade here illustrated. In any event, substantially simultaneous spreading and splitting of the covering takes place, regardless of whether the cutting edge is located just in front of the stripping sleeve or well up on the spreading cone thereof, so long as the wire is held firmly on its central axis by the sleeve and the covering is stretched outward to at least some extent by the spreading cone.

It is of course essential that the cone of the stripping sleeve spread only that portion of the covering which is to be stripped from the wire or cable. The close-fitting guide section 38 of the central passage 23 through sleeve 20 should therefore be only slightly larger than the diameter of the core C from which the covering D is to be stripped. It has been found for example that for solid and stranded wire conductors having AWG sizes of from No. 6 to No. 20, the diameter of the section 38 in the stripping sleeve may be approximately 0.003 to 0.005 inch larger than the conductor, where it is desired to strip a layer of plastic or rubber insulation from the conductor. The length of section 38, on the other hand, is not particularly critical but should be of sufficient extent to ensure proper guidance of the core C, when initially threading the wire through the stripping tool, in order to ensure that covering D rides up on the spreading cone of the stripping sleeve. Furthermore, if the wire W has an inner insulation which is not to be removed when the outer jacket is stripped, it is of course important that only the outer jacket be enaged by the conical surface 42. With this in mind it is also feasible to strip an outer jacket from a cabled core consisting of several individually insulated conductors which are twisted and wrapped.

It is also necessary in order to strip certain wires to increase or decrease the sharpness of the circular edge at the tip 44 of the sleeve where the spreading cone 42 meets the guide passage 38. In some cases for example, it may be necessary to have a relatively sharp edge in order to ensure separation of the covering D from the core C, while in others a duller edge may be desirable so as to avoid splitting the covering annularly and causing some of the covering material to follow the core through the sleeve 20 instead of being stripped off with the rest of the covering.

The slitting blade 22 is mounted on an elongated holder 50, which is supported on the top of upright 18 and extends forwardly above the stripping sleeve 20. The outer end of holder 50 has a longitudinal slot 52, in which blade 22 is held by means of a pair of vertically spaced set screws 54 which are threaded through one side of holder 50 into slot 52. Blade 22 is sharpened along its forward edge 53 and is desirably provided with a point 56 at the lower end of the cutting edge so that it can be positioned near the tip 44 of the cone 42 of sleeve 20. It is apparent that blade 22 may be readily removed or adjusted by simply loosening set screws 54.

In order to lock turret 26 so that the selected stripping sleeve 20 is held tightly in place as the wire W is being stripped, a tapered locking lug 60 is provided on the underside of holder 50 and projects down into a similarly tapered locating recess 62 in the periphery of turret 26. Holder 50 is pivotally supported on a bearing shaft 63 at its rear end between a pair of elongated mounting blocks 64 rigidly fixed, as by welding, to the upper end of upright 18. A locking bolt 66 extends down through an opening 68 in holder 50 into threaded engagement with the top of upright 18. When locking bolt 66 is turned down tight against holder 50, locking lug 60 is located firmly in engagement with the locating recess 62 in turret 26, preventing rotation thereof and locking the stripping sleeve 20 in place.

A locating recess 62 is provided adjacent each stripping sleeve 20, 20', each recess 62 being aligned with one of the sleeves 20, 20' so that turret 26 can be locked in place at any position to which it is indexed. This is done by simply removing locking bolt 66 and pivoting holder 50 upward on its bearing shaft 63 to an inoperative position shown in broken lines in FIG. 1. Turret 26 can then be rotated to bring any of the other stripping sleeves 20' into operative position below the raised holder 50. Holder 50 is then lowered so that the locking lug 60 moves into engagement with the corresponding locating recess 62 in the turret. By replacing locking bolt 66 and tightening it, the turret 26 is again locked against rotation. At the same time the splitting blade 22 is moved back approximately into position with respect to the cone 42 on the stripping sleeve. Set screws 54 of blade 22 are then loosened so that blade 22 can be set properly relative to the tip 44 of stripping sleeve 20.

Locating recesses 62 in the periphery of turret 26 are desirably formed by countersinking and tapering the outer end of the bore into which the set screws 36, 36' for each stripping sleeve is threaded. As shown in FIG. 1, set screws 36, 36' are short enough so that they are located inwardly of the tapered recess 62 and do not interfere with locking lug 60.

As mentioned hereinbefore, each size wire requires a different stripping sleeve so that the covering to be stripped will be properly engaged by the cone. The primary difference between stripping sleeves is the size of the opening 38 through which the core C of the wire passes. This opening must be only large enough to allow passage of the core C without damaging it, and to force the covering D to slide up on the cone 42. For example, since the diameter of the conductor differs for the same AWG wire size, depending on whether it is a solid or stranded conductor, it is necessary to have a slightly larger opening 38 for a wire with a stranded conductor than for one with a solid conductor of the same wire size.

The angle of the conical surface 42 on the sleeve may also vary somewhat depending on the thickness of the covering to be stripped and whether or not it stretches easily or is comparatively stiff. It has been found, however, that in most cases the included angle of the cone should be on the order of 25° to 30°. If the covering is thin and tends to bunch up in front of the tip of the sleeve instead of sliding up the cone, the angle of the cone may be reduced and the intersection between the opening or guide passage 38 and the conical surface 42 may have to be fairly sharp, so that the tip 44 of the cone will penetrate between the core and the covering to be stripped.

Once the correct stripping sleeve 20 has been selected and the slitting blade 22 adjusted relative thereto, a length of the core C is bared by hand and threaded through the sleeve. The core is then drawn through the sleeve and fastened to the take-up winch (not shown). As this is done the covering D will be stripped from the wire and further adjustment of the blade 22 with respect to sleeve 20 may be made in order to ensure proper stripping. Before starting the take-up winch the wire W is centered on the axis of the stripping sleeve 20 by means of the guide rollers 12 and 14 on opposite sides of the stripping tool 10. In most cases accurate alignment is not necessary, due to the self-aligning action of the cone 42 on the wire as the covering D is spread outward by it. However, if the conductor or core C shows any signs of scoring or other damage, it may be necessary to adjust the guides 12 and 14 so that it does not contact any portion of the passage 38 through sleeve 20. When properly adjusted the wire can be drawn at high speed through the stripping tool, which peels the covering D therefrom in a continuous length. A large opening 70 is provided in base 16 under the stripping tool for depositing the strippings from the wire in a container (not shown).

It will be apparent that both short and long lengths of wire may be stripped by this tool at great savings in time and material.

What is claimed is:

1. The method of stripping stretchable coverings from wire and cable which comprises the steps of drawing the core of the wire through a stationary tool and spreading the covering outwardly away from the core uniformly about its circumference by forcing it over a tapered end of the tool so that the core is centered with respect to the tool and at the same time the covering is stretched circumferentially of the wire by such spreading action, and cutting the covering longitudinally of the wire at a point where it has been thus stretched.

2. In a stripping tool for removing stretchable coverings from continuous lengths of wire and cable, the combination comprising a sleeve member having an opening through which the core of the wire being stripped is continuously drawn in one direction, said opening being only slightly larger than the core and having a central longitudinal axis, said sleeve member having a tapered outer surface at its leading end over which the covering of the wire is forced as it is drawn through said sleeve member in order to spread the covering outwardly and to stretch it uniformly, circumferentially of the wire, said tapered surface having a central longitudinal axis coinciding with the central axis of said opening such that the stretching action of said tapered surface centers the core within said opening, and a cutter for slitting said covering longitudinally of the wire, said cutter being mounted in cooperative relation with the tapered surface of said sleeve member and having a cutting edge disposed adjacent the leading end of said sleeve member in an area where the wire covering is stretched outwardly by said tapered surface.

3. A stripping tool as defined in claim 2, wherein said tapered surface is conical.

4. A stripping tool as defined in claim 3, wherein a plurality of said sleeve members are mounted on a rotary turret, each of said sleeve members being brought successively into an operative position with respect to said cutter upon intermittent rotation of said turret, and means for locking said turret in place when each of said sleeve members is located in said operative position.

5. A stripping tool as defined in claim 4, wherein said turret-locking means comprises an elongated holder pivotally supported adjacent said operative position for pivotal movement into and out of locking relation with said turret, said holder having means adjacent its outer end for adjustably mounting said cutter such that said cutter is pivoted out of operative relation with said sleeve member when said holder is moved out of locking relation with said turret.

6. A stripping tool as defined in claim 5, wherein said turret is provided with a plurality of locking recesses in its periphery, one adjacent each of said sleeve members, said holder having a locking lug engageable with one of said locking recesses when said holder is in locking relation with said turret.

7. A stripping tool as defined in claim 2, wherein the cutting edge of said cutter is disposed longitudinally of said sleeve member at a point along the tapered surface thereof from the tip rearward in the direction of wire travel.

References Cited

UNITED STATES PATENTS

| 2,046,341 | 7/1936 | McParlin | 81—9.51 X |
| 2,366,271 | 1/1945 | Lerch | 81—9.51 X |
| 2,391,721 | 12/1945 | Lundeen | 81—9.51 X |
| 3,175,430 | 3/1965 | Smith et al. | 81—9.51 |

FOREIGN PATENTS 555,448  8/1943  Great Britain.

WILLIAM FELDMAN, *Primary Examiner.*

MILTON S. MEHR, *Examiner.*